United States Patent [19]

Kamide et al.

[11] Patent Number: 5,287,230
[45] Date of Patent: Feb. 15, 1994

[54] VIDEO SIGNAL REPRODUCING APPARATUS WITH INDEX INFORMATION DISPLAY

[75] Inventors: Kazuya Kamide, Kanagawa; Noboru Motoyoshi, Tokyo, both of Japan

[73] Assignee: Sony Corporation, Tokyo, Japan

[21] Appl. No.: 958,425

[22] Filed: Oct. 8, 1992

[30] Foreign Application Priority Data

Oct. 14, 1991 [JP] Japan ................... 3-265005

[51] Int. Cl.⁵ ............... G11B 15/04; G11B 19/04; G11B 15/18; G11B 17/00
[52] U.S. Cl. .............................. 360/60; 360/69
[58] Field of Search ............ 360/60, 49, 64, 722, 360/69 X, 75, 33.1, 32, 57, 48, 63, 27, 132; 369/13; 358/322, 335; 242/198

[56] References Cited

U.S. PATENT DOCUMENTS

| | | | |
|---|---|---|---|
| 4,357,638 | 11/1982 | Yoshimaru et al. | 360/49 X |
| 4,477,847 | 10/1984 | Knight et al. | 360/60 |
| 4,554,651 | 11/1985 | Kawai et al. | 360/60 X |
| 4,791,497 | 12/1988 | Nakano et al. | 360/32 |
| 4,799,111 | 1/1989 | Ito | 360/49 X |
| 4,908,725 | 3/1990 | Iwahashi | 360/60 X |
| 5,148,328 | 9/1992 | Kakuyama | 360/32 X |
| 5,177,646 | 1/1993 | Lee | 360/60 |

*Primary Examiner*—Donald Hajec
*Assistant Examiner*—Patrick Wamsley
*Attorney, Agent, or Firm*—Jerry A. Miller

[57] ABSTRACT

A video signal reproducing apparatus, typically an 8-mm video tape recorder, reproduces a signal recorded along inclined tracks on a magnetic video tape in a tape cassette having an erase prevention member. The video signal reproducing apparatus has an erase prevention detector for detecting whether a further signal can be recorded on the magnetic video tape or not based on the status of the erase prevention member. A reproducing circuit reproduces the recorded signal from the magnetic video tape for a predetermined period of time, typically one second, when the erase prevention detector detects that no further signal can be recorded on the magnetic video tape. An index extracting circuit extracts an index signal from the reproduced signal, and the extracted index signal is decoded by an index decoder. The decoded index information, typically a chapter number, is displayed on a television monitor in response to the depression of an index key on a control panel.

4 Claims, 5 Drawing Sheets

VIDEO SIGNAL REPRODUCING APPARATUS WITH INDEX INFORMATION DISPLAY

BACKGROUND OF THE INVENTION

1. Field of the Invention

The present invention relates to a video signal reproducing apparatus suitable for use in an 8-mm video tape recorder, for example.

2. Description of the Prior Art

There have heretofore been proposed and used video tape recorders for recording video signals in various formats. The video tape recorders include an 8-mm video tape recorder, a VHS video tape recorder, and a Beta video tape recorder among others. The 8-mm video tape recorder finds wide use in consumer and business applications as it employs much smaller tape cassettes than the VHS and Beta video tape recorders, and can record and reproduce images and sounds with high quality and is capable of recording audio signals by way of multiple pulse code modulation (PCM).

The 8-mm video tape recorder has an audio signal recording mode in which it records an audio signal on a video tape by frequency-modulating the audio signal and mixing it with a color video signal such that the audio signal can be divided in terms of frequencies. In another optional audio signal recording mode, the audio signal is pulse-code-modulated (PCM), and the PCM audio signal and the color video signal are recorded in different regions along one track on a video tape.

FIG. 1 of the accompanying drawings shows a rotary head assembly of an 8-mm video tape recorder, and FIG. 2 shows a recording format or pattern of tracks recorded on a video tape by the rotary head assembly.

As shown in FIG. 1, the rotary head assembly has recording and reproducing magnetic heads HA, HB whose gaps have different azimuth angles from each other and which are mounted on a drum 1 in a 180°-spaced relationship to each other. The recording and reproducing magnetic heads HA, HB have tips projecting slightly radially outwardly from the outer circumferential surface of the drum 1. The recording and reproducing magnetic heads HA, HB are rotated with the drum 1 in the direction indicated by the arrow 3H at a frame frequency of 30 Hz.

When the recording and reproducing magnetic heads 4A, 4B are thus rotated, as shown in FIG. 2, signals are recorded along tracks 4A, 4B having a length corresponding to an angle of 221° which are alternately formed on a magnetic video tape 2 by the respective recording and reproducing magnetic heads 4A, 4B. An audio signal, which is pulse-code-modulated and time-compressed, relative to one field of a video signal is recorded in an area AP that corresponds to an angular range of about 36° (including an after-recording margin for the pulse-code-modulated audio signal and a guard band) from the starting end of each of the tracks 4A, 4B. Then, one field of color video signal, an FM audio signal, and a tracking signal are recorded in an area AV over an angular range of 180° following the area AP. The remaining angular range of 5° of each of the tracks 4A, 4B provides a marginal interval in which the recording and reproducing magnetic head leaves the video tape 5.

The after-recording margin includes an index area for recording count values of one frame, time data representing year, month, date, hour, minute, and second, and chapter data.

When a magnetic video tape with no such time and chapter data recorded in the index area is played back on an 8-mm video tape recorder upon pressing of a playback button thereof, the recorded count values are automatically displayed successively. When a magnetic video tape with time and chapter data recorded in the index area is played back on an 8-mm video tape recorder upon pressing of a playback button thereof, the time data indicating year, month, and date or the time data of hour, minute, and second is selectively displayed in response to the depression of a corresponding button.

The chapter data, which means almost the same as chapter data for video discs, is data indicative of a certain range on the magnetic video tape 2.

The data recorded in the index area can be displayed when a certain button of the 8-mm video tape recorder is pressed while the magnetic video tape 2 is being played back by the 8-mm video tape recorder.

In use, the tape cassette housing the magnetic video tape 2 is loaded in the above 8-mm video tape recorder, and thereafter the playback button is pressed to transport the magnetic video tape 2 for signal reproduction. Only at this time, or only when a certain button is pressed while the magnetic video tape 2 is being played back, the desired data recorded in the index area is displayed. Therefore, the user may find the display process cumbersome, and cannot recognize the index information of the tape cassette immediately when the tape cassette is loaded in the video tape recorder.

OBJECTS AND SUMMARY OF THE INVENTION

In view of the aforesaid conventional problems, it is an object of the present invention to provide a video signal reproducing apparatus which allows the user to determine whether index information is recorded on a magnetic video tape in a tape cassette, immediately when the tape cassette is loaded, and which also permits the user to confirm overall information on the magnetic video tape for the selection of a desired range on the magnetic video tape just like a video disc, for example, so that the user can handle the video signal reproducing apparatus with ease.

According to the present invention, there is provided a video signal reproducing apparatus for reproducing a signal recorded along inclined tracks on a magnetic video tape in a tape cassette having an erase prevention member, the video signal reproducing apparatus comprising detecting means for detecting whether a further signal can be recorded on the magnetic video tape or not based on the status of the erase prevention member, reproducing means for reproducing the recorded signal from the magnetic video tape for a predetermined period of time when the detecting means detects that no further signal can be recorded on the magnetic video tape, decoding means for decoding index information contained in the reproduced signal, and displaying means for displaying the decoded index information in response to a predetermined control command.

The index information includes chapter number data. The reproducing means reproduces the recorded signal from the magnetic video tape for one second.

The video signal reproducing apparatus further includes a control panel for producing the predetermined control command.

When a tape cassette with its erase prevention member set to prevent further signals from being recorded is loaded in the video signal reproducing apparatus, the recorded signal is automatically reproduced for one second, and a chapter number is read from the reproduced index signal and displayed on the displaying means. Therefore, the user can immediately determine whether index information is recorded on the magnetic video tape in the loaded tape cassette or not, and can also confirm overall information recorded on the magnetic video tape. The user can select any desired portion of the magnetic video tape for reproduction, just like a video disc, so that the user can handle the video signal reproducing apparatus with ease.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
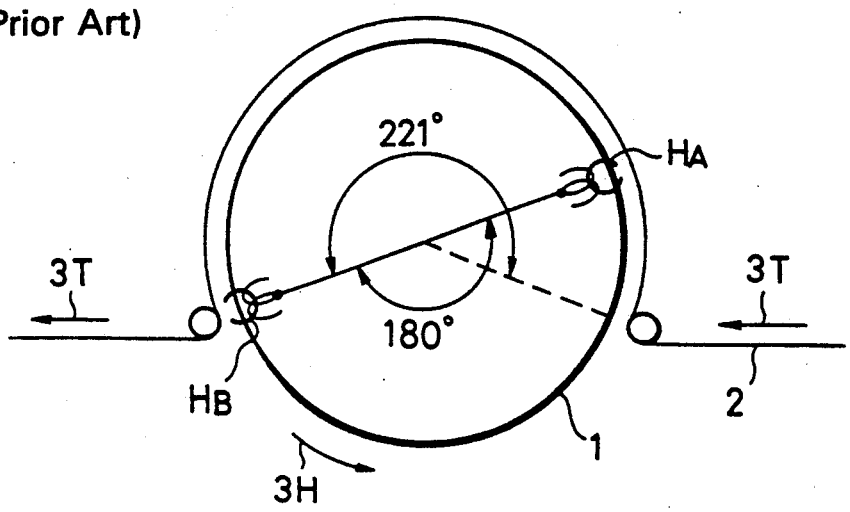
FIG. 1 is a schematic view of a rotary head assembly of an existing 8-mm video tape recorder.
Figure 2:
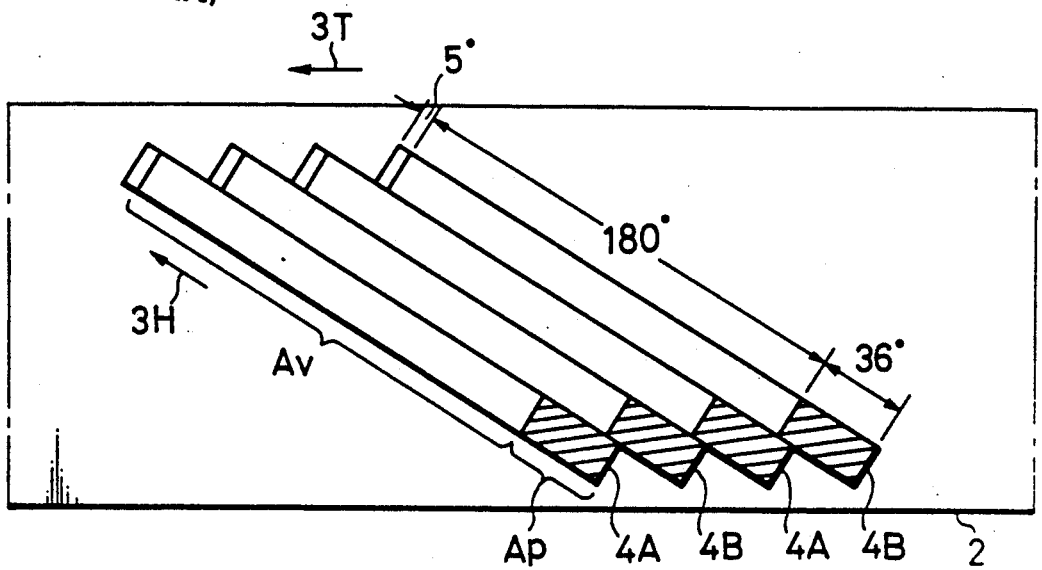
FIG. 2 is a diagram showing a pattern of tracks recorded on a magnetic video tape by the 8-mm video tape recorder shown in FIG. 1.
Figure 3:
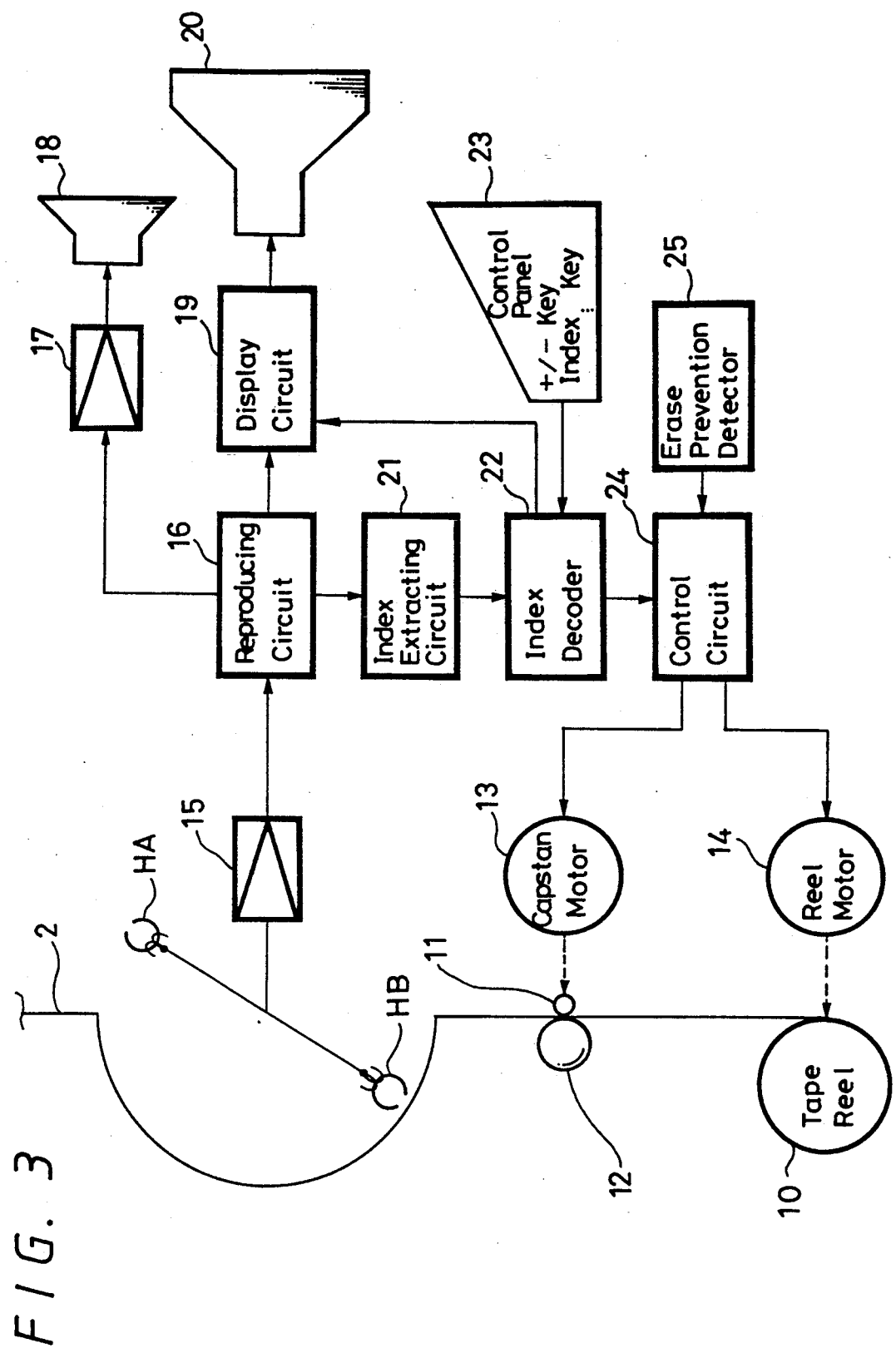
FIG. 3 is a block diagram of a video signal reproducing apparatus according to the present invention.

As shown in FIG. 3, a video signal reproducing apparatus according to the present invention, which may typically be an 8-mm video tape recorder, includes a rotary head assembly similar to the rotary head assembly shown in FIG. 1. Specifically, the rotary head assembly shown in FIG. 3 has recording and reproducing magnetic heads HA, HB identical in structure and arrangement to those shown in FIG. 1. A magnetic video tape 2 unwound from a tape reel 10 in a tape cassette is gripped between a pinch roller 12 and a capstan 11, and wrapped around a rotary drum. As the magnetic video tape 2 runs around the rotary drum, it is scanned by the magnetic heads HA, HB to reproduce recorded signals from the magnetic video tape 2.

The video signal reproducing apparatus also includes a reproducing circuit 16 for reproducing signals that are supplied from the magnetic heads HA, HB through an amplifier 15.

More specifically, the reproducing circuit 16 frequency-modulates luminance and chrominance video signals, processes the frequency-modulated luminance and chrominance video signals for time base correction, etc., then adds the processed luminance and chrominance video signals into a composite color video signal. The composite color video signal is then supplied through a display circuit 19 to a television monitor 20 which displays a color image on its screen.

The reproducing circuit 16 also processes a frequency-modulated audio signal for noise reduction, etc., and supplies the processed audio signal through an amplifier 17 to a loudspeaker 18 which radiates reproduced sounds.

In the case where the video signal reproducing apparatus comprises a video tape recorder which is designed to reproduce a PCM audio signal such PCM audio signal is reproduced with priority over the frequency-modulated audio signal. In this case, the reproducing circuit 16 expands the time base of and demodulates the reproduced PCM audio signal, detects and corrects errors in the audio signal, then effects eight-to-ten encoding and interpolation on the audio signal, converts the audio signal into an analog audio signal with a D/A converter, and processes the analog audio signal for noise reduction, etc. Thereafter, the reproducing circuit 16 supplies the processed audio signal through an amplifier 17 to a loudspeaker 18 which radiates reproduced sounds.

The video signal reproducing apparatus has an index extracting circuit 21 for obtaining an index signal from the reproduced signal from the reproducing circuit 16. The index signal obtained by the index extracting circuit 21 is decoded by an index decoder 22 and supplied to a control circuit 24 and the display circuit 19.

The control circuit 24 serves to control a capstan motor 13 which rotates the capstan 11, and a reel motor 14 which rotates the tape reel 10. The control circuit 24 controls the various circuits, the capstan motor 13, and the reel motor 14 according to input signals that are entered through a control panel 23 which has various keys including an increment/decrement key, an index key, etc.

A known erase prevention detector 25 detects the status of the erase prevention member of the loaded tape cassette to determine whether signals can be recorded on the magnetic video tape 2 or not.

When the tape cassette is loaded in the video signal reproducing apparatus, if the erase prevention detector 25 detects that no signals can be recorded on the tape 2 in the loaded tape cassette, then the control circuit 24 automatically reproduces recorded signals from the tape 2 for one second, and supplies the data of the read index signal, e.g., year, month, date, hour, minute, second, chapter, etc., to the index decoder 22, which then supplies the data through the display circuit 19 to the television monitor 20. If the erase prevention detector 25 detects that signals can be recorded on the tape 2 in the loaded tape cassette, then the control circuit 24 waits for an input signal from the control panel 23 in the usual manner.

The index signal will be described below with reference to FIG. 4.

Figure 4:
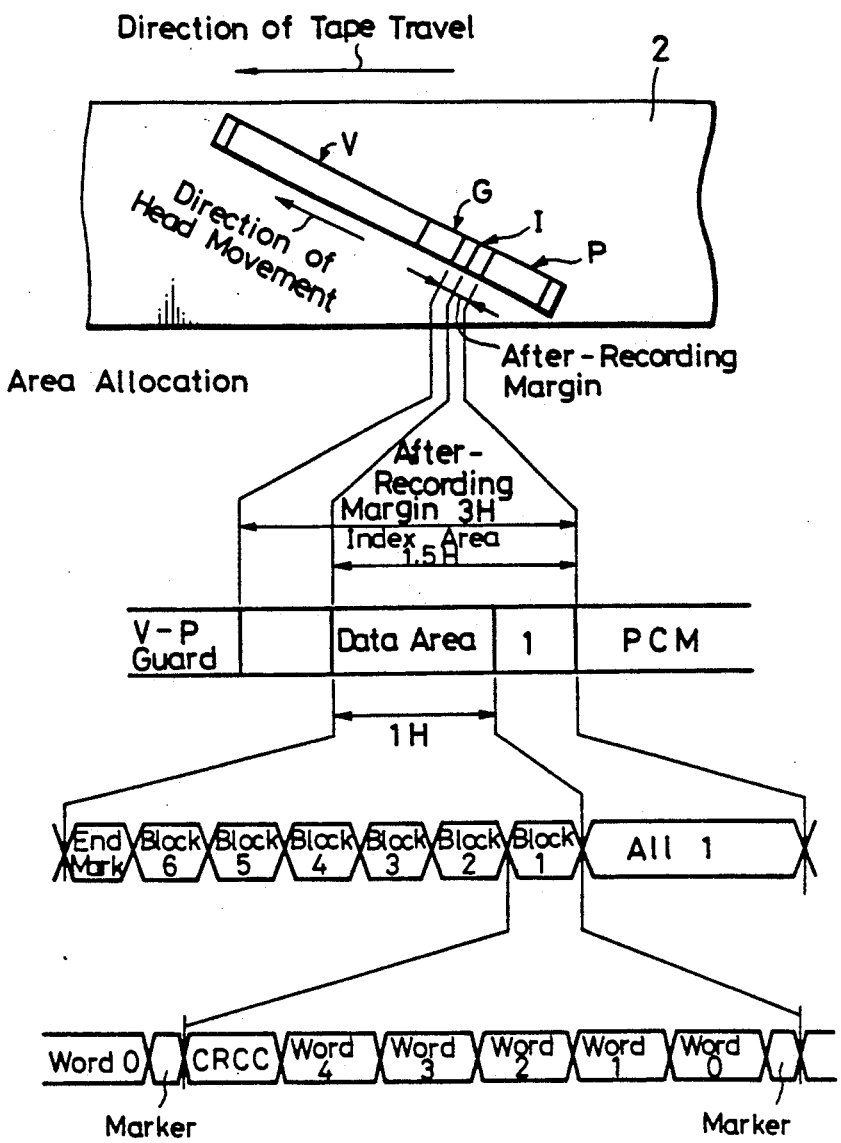
FIG. 4 is a diagram showing an index area recorded on a magnetic video tape by the video signal reproducing apparatus shown in FIG. 3.

As shown in FIG. 4, each of the tracks formed on the magnetic video tape 2 is generally composed of a signal area V for recording video and FM audio signals, a guard band G, an index area I in an after-recording margin, and an area P for recording a PCM audio signal.

As shown in FIG. 4, the index area I has a length of 1.5H (H: interval between horizontal sync pulses), and comprises a data area of 1H and an all-1 area of 0.5H.

As shown in FIG. 4, the data area is composed of six blocks and an end mark. As shown in FIG. 4, each of the six blocks comprises a marker, a word 0 for distinguishing data, a word 4 for recording a frame number, words 1, 2, 3 for recording data, and an area for recording an error detecting code (CRCC).

For example, data about the year, month, and date are recorded in the block 1, with the year recorded in the word 1, the month in the word 2, and the date in the word 3. Data about the hour, minute, and second are recorded in the block 2, with the hour recorded in the word 1, the minute in the word 2, and the second in the word 3.

The index area also records a program number (chapter), an absolute address, a dubbing Telop (information representing whether or not the tape is protected from dubbing), e.g., a movie, and also data indicative of whether the recorded video is commercially available material or not, whether the recorded audio is stereophonic or not, and whether the recorded audio is bilingual or not.

When the video signal reproducing apparatus is loaded with a tape cassette which has its erase prevention member set to prevent further signals from being recorded on the magnetic video tape 2, the erase prevention detector 25 detects that no signals can be recorded on the magnetic video tape 2, and supplies a detected signal to the control circuit 24.

The control circuit 24 then energizes the capstan motor 13 and the reel motor 14 to rotate the tape reel 10 and the capstan 11, and also energizes the magnetic heads HA, HB.

The magnetic video tape 2 is now scanned by the magnetic heads HA, HB, and the signals recorded on the magnetic video tape 2 are reproduced by the reproducing circuit 15. From the reproduced signals, there is extracted an index signal by the index extracting circuit 21, and the data of the extracted index signal are read by the index decoder 22. The current chapter number data of the read index data are supplied from the index decoder 22 to the display circuit 19.

The display circuit 19 converts the supplied chapter number data into a character signal for displaying a chapter number on the television monitor 20, and supplies the character signal to the television monitor 20. The television monitor 20 now displays chapter numbers as shown in FIG. 7.

Figure 7:
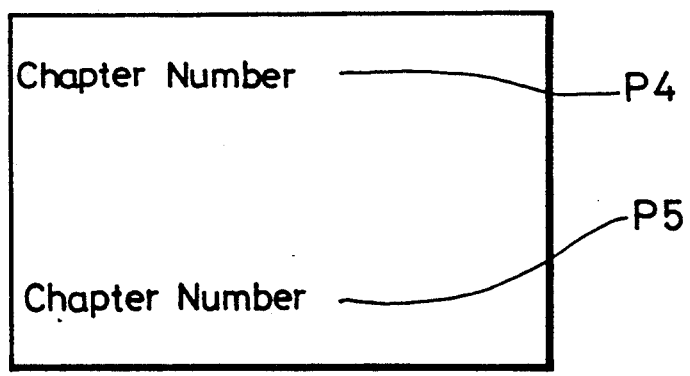
FIG. 7 is a diagram showing displayed chapter number data.

In FIG. 7, the screen of the television monitor 20 has a display area P4 for displaying a selected chapter number and a display area P5 for displaying an executed chapter number, i.e., the chapter number of a portion of the magnetic video tape 2 which is being currently reproduced.

When the increment/decrement key or the index key on the control panel 23 is pressed, chapter numbers are successively displayed in the display area P4. If a fast-forward key or a rewind key on the control panel 23 is pressed, then those tracks on the magnetic video tape 2 whose index areas store the chapter number displayed in the display area P4 are searched for.

In the above searching process, the display area P5 successively displays current chapters.

Figure 5:
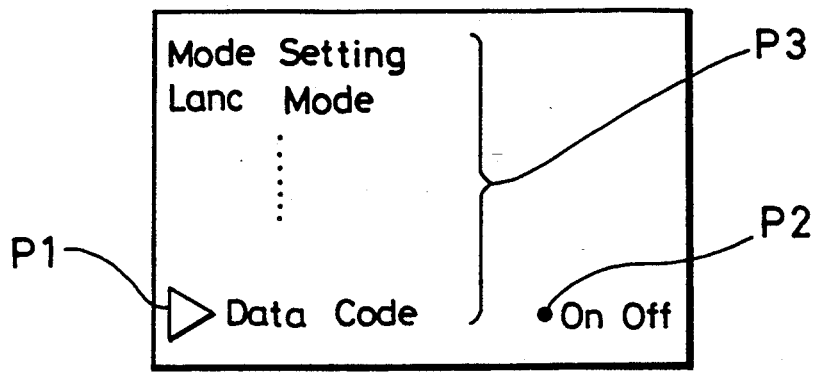
FIG. 5 is a diagram showing a displayed menu.

When a menu display key on the control panel 23 is pressed, the display circuit 19 displays a menu on the television monitor 20 as shown in FIG. 5. The menu displays various items P3 for setting modes.

On the menu, the increment/decrement key on the control panel 23 is pressed to move a cursor P1 to select one of the displayed items P3.

Figure 6:
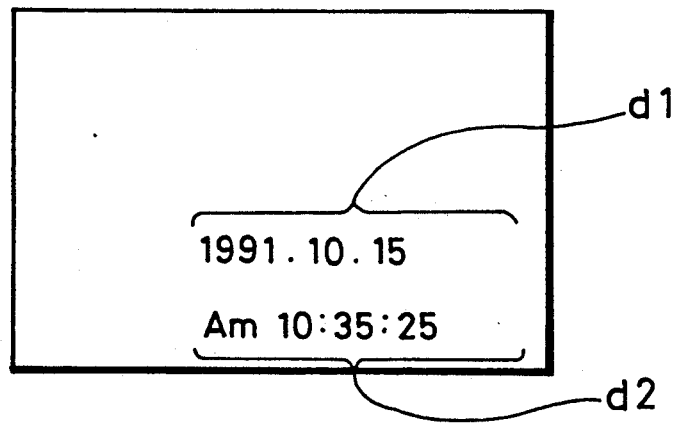
FIG. 6 is a diagram showing displayed time data.

If the item "DATA CODE" is selected, and then a pointer P2 is moved to the left of "ON" to select "ON" by the incremental/decremental key, then the display circuit 19 simultaneously displays data d1 of year, month, and date and data d2 of hour, minute, and second, read from the index area, on the television monitor 20 as shown in FIG. 6, for example when recorded signals are reproduced from the magnetic video tape in the tape cassette whose erase prevention member is set to allow further signals to be recorded.

If the item "DATA CODE" is selected, and then the pointer P2 is moved to the left of "OFF" to select "OFF" by the increment/decrement key, then the display circuit 19 displays the count of a counter on the television monitor 20.

As described above, when a tape cassette with its erase prevention member set to prevent further signals from being recorded is loaded in the video signal reproducing apparatus, the control circuit 24 automatically reproduces recorded signals from the tape 2 for one second, and reads a chapter number from the reproduced index signal and displays the chapter number on the television monitor 20. Therefore, the user can immediately determine whether index information is recorded on the magnetic video tape in the loaded tape cassette or not, and can also confirm overall information recorded on the magnetic video tape 2. The user can select any desired portion of the magnetic video tape 2 for reproduction, just like a video disc, so that the user can handle the video signal reproducing apparatus with ease.

If the user selects the "DATA CODE" on the displayed menu, then the television monitor 20 simultaneously displays the data d1 of year, month, and date and the data d2 of hour, minute, and second, as when recorded signals are reproduced from the magnetic video tape in the tape cassette whose erase prevention member is set to allow further signals to be recorded. Consequently, when a tape cassette with data of year, month, and date and the data of hour, minute, and second being recorded in an index area are played back on a video tape recorder combined with a video camera, the user can immediately confirm the year, the month, and the date, and also the hour, the minute, and the second when the signals were recorded on the tape.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A video signal reproducing apparatus for reproducing a signal recorded along inclined tracks on a magnetic video tape in a tape cassette having an erase prevention member, said video signal reproducing apparatus comprising:

detecting means for detecting whether a further signal can be recorded on the magnetic video tape or not based on the status of the erase prevention member;

reproducing means for reproducing the recorded signal from the magnetic video tape for a predetermined period of time when said detecting means detects that no further signal can be recorded on the magnetic video tape;

decoding means for decoding index information contained in the reproduced signal; and displaying means for displaying the decoded index information in response to a predetermined control command.

2. A video signal reproducing apparatus according to claim 1, wherein said index information includes chapter number data.

3. A video signal reproducing apparatus according to claim 1, wherein said reproducing means comprises means for reproducing the recorded signal from the magnetic video tape for one second.

4. A video signal reproducing apparatus according to claim 1, further including a control panel for producing said predetermined control command.

* * * * *